W. C. FARNUM.
TRANSMISSION MECHANISM FOR MOTORS.
APPLICATION FILED AUG. 30, 1917.

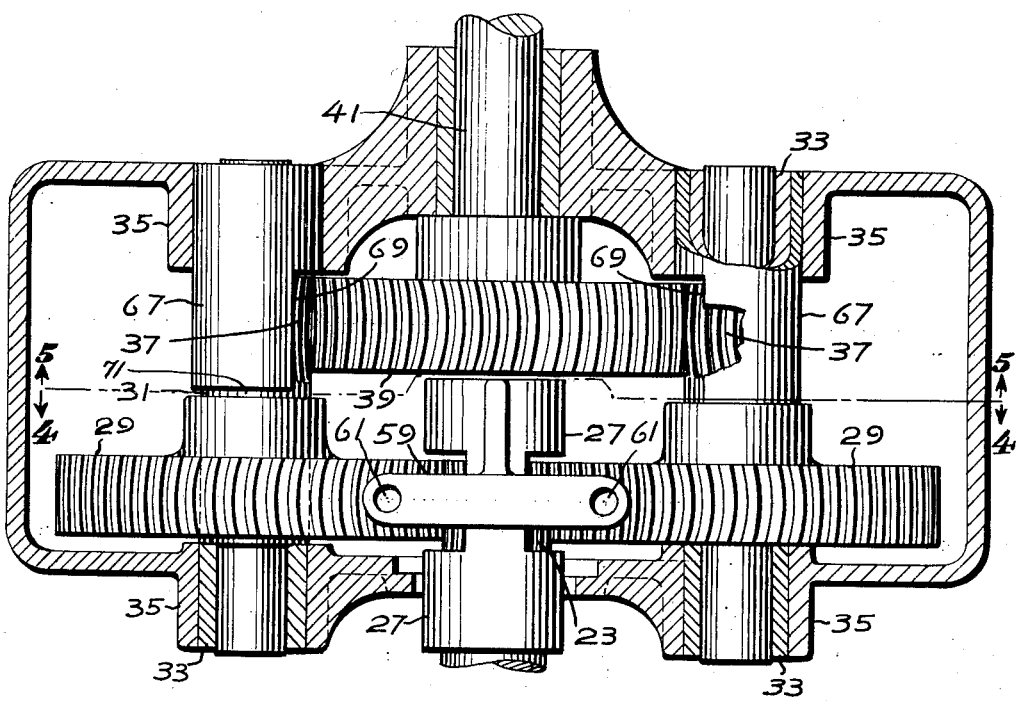
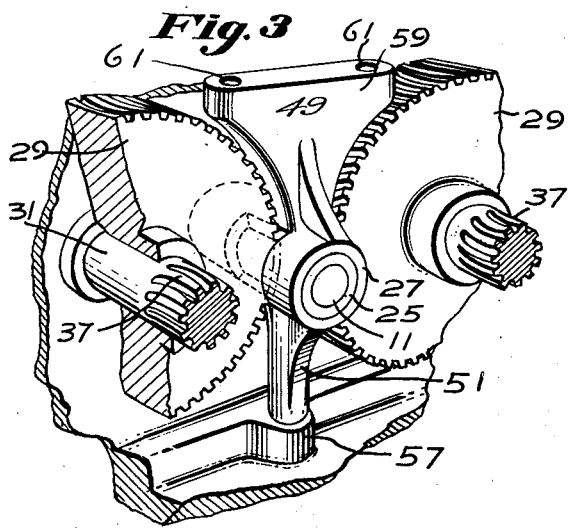

1,383,705. Patented July 5, 1921.

Inventor
William C. Farnum
by Rob't P. Hains
Attorney

UNITED STATES PATENT OFFICE.

WILLIAM C. FARNUM, OF WINCHENDON, MASSACHUSETTS.

TRANSMISSION MECHANISM FOR MOTORS.

1,383,705.  Specification of Letters Patent.  Patented July 5, 1921.

Application filed August 30, 1917. Serial No. 189,016.

*To all whom it may concern:*

Be it known that I, WILLIAM C. FARNUM, a citizen of the United States, residing at Winchendon, county of Worcester, and State of Massachusetts, have invented an Improvement in Transmission Mechanism for Motors, of which the following description, in connection with the accompanying drawings, is a specification, like characters on the drawings representing like parts.

The invention hereinafter described relates to transmission mechanism for motors.

If suitable speed reduction mechanism can be provided, it is possible to generate relatively high torque from small high speed electric motors. Since these motors are cheap to construct and operate, their use is very desirable. Heretofore speed reduction gears have been used for this purpose, but serious objections have been encountered in gearing down such motors.

If the motor shaft drives a pinion, the driving radius of the latter is so small that an excessive driving pressure or load is brought to bear on the teeth of the pinion at the pitch circle thereof, thereby causing said teeth to quickly wear out or become broken; and the shaft for the pinion is pressed against its bearing with an excessive pressure, causing the bearing to quickly wear out and prevent the proper intermeshing relation between the teeth of the pinion and the gear driven thereby.

If the motor shaft drives a gear of any considerable size, instead of a small pinion, in order to reduce the pressure on the teeth of the gear, excessive peripheral speed is developed which renders the use of such gears objectionable.

One of the objects of the present invention is to provide a speed reduction mechanism for motors, whereby the power is taken from a small pinion by gears meshing therewith at points distributed circumferentially of the pinion so that the total power transmitted from the pinion is substantially equally divided among said gears and thus the driving pressure of the teeth of the pinion on the teeth of the gears meshing therewith is reduced in proportion to the number of gears used. For example, if two gears mesh with and are driven by the pinion, the driving pressure of the teeth of the pinion on the teeth of each of the gears driven thereby is one half of the driving pressure if only one gear is used to take the power from the pinion. If the reduction in the driving pressure had by these gears is to be maintained it is important that the gears meshing with and driven by the pinion should take substantially equal power from the pinion, for if the relation between the pinion and one of the gears is such that it shirks this duty, the duty on the other gear is proportionately increased, and a condition may be reached where substantially all of the power will be taken from the pinion by one of the gears, with the objections thereto above noted. An important feature of the invention, therefore, is the provision of means whereby the pressure of the teeth of the pinion on the teeth of the gears meshing therewith is automatically equalized. As a consequence, ideal driving relations between the pinion and said gears are maintained, thereby greatly increasing the efficiency and life thereof.

A further important advantage of the mechanism to be described is that the pinion and the gears meshing therewith are so related and controlled that the objectionable pressure of the pinion shaft against its bearing, referred to, is eliminated.

Another object of the invention is to provide a transmission mechanism with gears having curved teeth, the organization being such that the pinion and the gears meshing therewith are automatically maintained in proper alinement to insure efficient driving conditions.

With the aforesaid important objects and other objects in view, the character of the invention may be best understood by the following description of one good form of the invention shown in the accompanying drawings, wherein:

Fig. 2 is a horizontal section through the transmission mechanism;

Fig. 3 is a perspective view of the carrier for the driving pinion, portions of the gears driven thereby, and other parts coöperating therewith;

Figure 1:
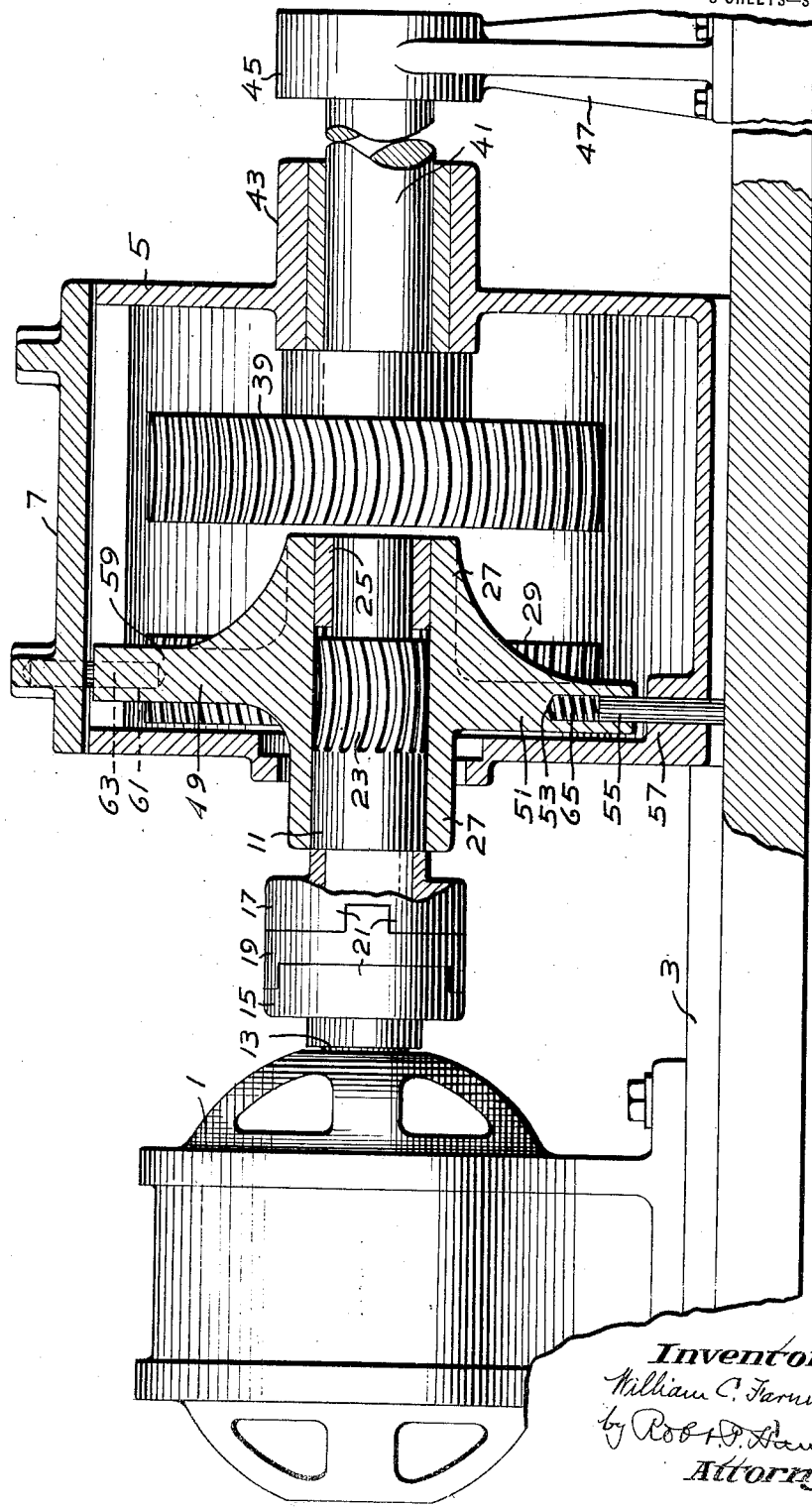
Figure 1 is a view showing a motor in side elevation and a transmission mechanism therefor in vertical section.

Referring to the drawings, the transmission mechanism shown therein, in the present instance of the invention, is applied to a small high speed electric motor 1 of usual construction mounted on a base 3. This transmission mechanism may be supported in any suitable manner, but herein is shown mounted in and protected by a casing 5 having a cover 7 detachably secured thereto by screw bolts 9.

Said mechanism comprises a driving member or shaft 11 which may be flexibly connected to and driven by the motor shaft 13 by a flexible connection with said shaft. This connection, in the present instance of the invention, consists of a clutch of the Oldham type, comprising a member 15 secured to the motor shaft and a corresponding member 17 secured to the driving shaft, said members having interposed between them a floating member 19 engaged by projections 21 and corresponding notches in the members 15 and 17, as well understood in this type of clutch. The construction is such that the driving shaft may be moved bodily relatively to the axis of the motor shaft.

Figure 4:
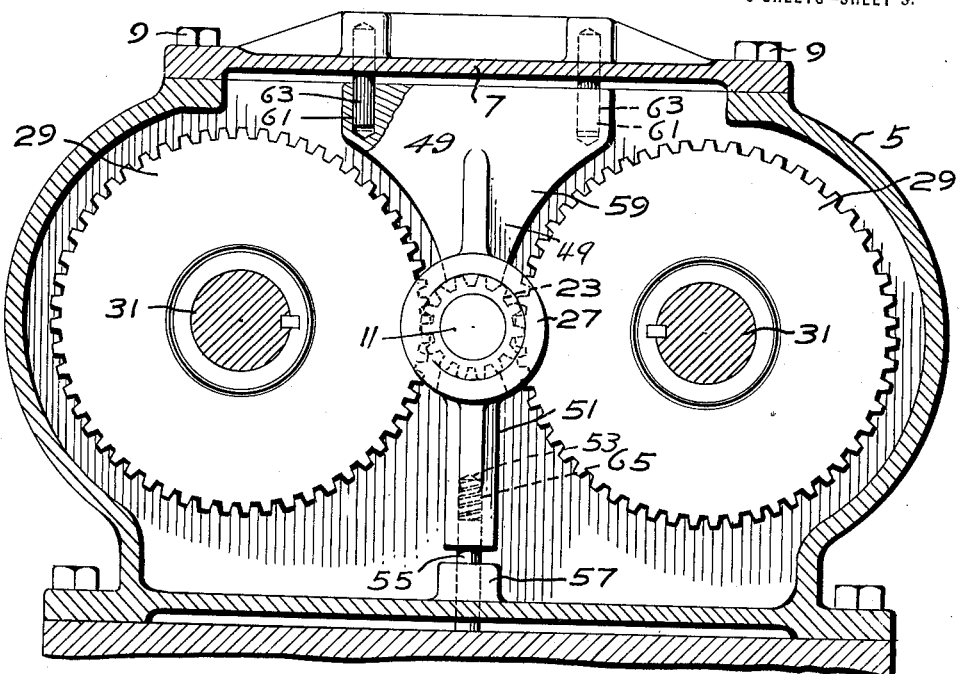
Fig. 4 is a vertical section taken on line 4—4 of Fig. 2.
Figure 5:
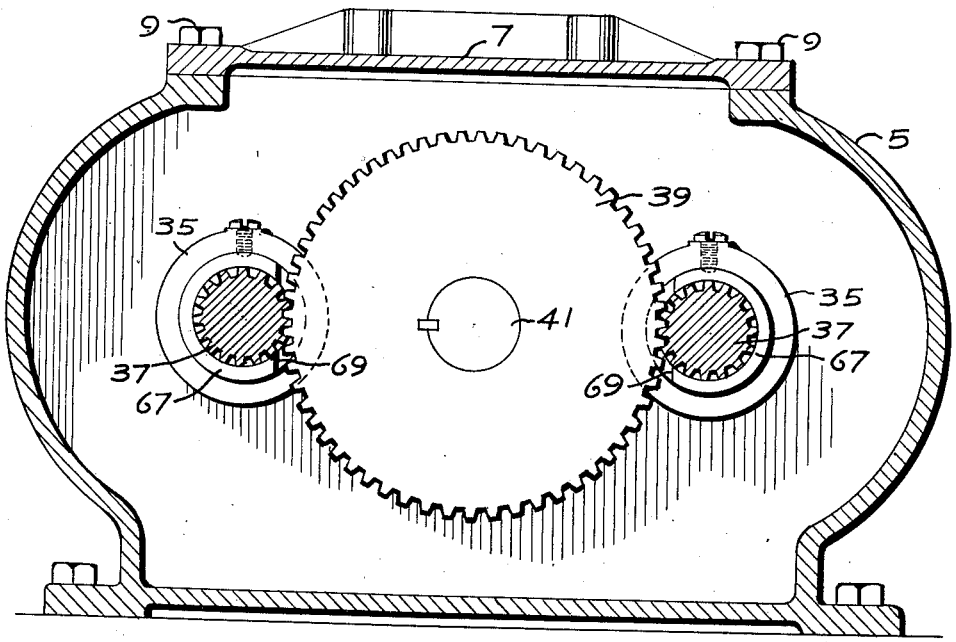
Fig. 5 is a vertical section taken on line 5—5 of Fig. 2.

The driving shaft (Fig. 4) may have a pinion 23 thereon preferably integral therewith, the end portions of said shaft being reduced and journaled in bushings 25 secured in boss bearings 27 supported as more fully hereinafter described.

Since the driving pinion is directly connected to the motor shaft, it will share the high speed imparted thereto. To reduce this speed, a plurality of large gears 29 may be provided, which may vary in number, but in the present exemplification of the invention, a pair of such gears are provided meshing with the driving pinion at points circumferentially separated thereon and preferably diametrically opposed. These large gears may be mounted fast on counter shafts 31 having reduced end portions journaled in bushings 33 suitably secured in boss bearings 35, which may be formed integral with said casing.

To further reduce the speed transmitted, pinions 37 may be mounted on and preferably are formed integral with said counter shafts and mesh with opposite sides of a large driven gear 39 fast on a shaft 41 journaled in bushings secured in a boss bearing 43 integral with said casing and a bearing 45 on a standard 47 mounted on the base 3, referred to. This driven shaft may be in axial alinement with the driving shaft, the ends of said shafts being spaced a slight distance, as will be noted in Figs. 1 and 2.

The power taken from the driving pinion is distributed to the gears meshing therewith, and therefore, the driving pressure of the pinion teeth on the teeth of said gears is reduced in proportion to the number of such gears used. In the present case, since two gears are used, said pressure is reduced to one-half of what it would be if a single gear were relied upon to take the power from said pinion.

I am aware that power has been taken from a motor driven pinion by a pair of gears meshing with the opposite sides thereof, but if the pinion and gears are not perfect and their mountings are not accurately disposed with relation to one another, they will not so mesh that the teeth of the pinion will press with equal pressure on the teeth of the opposed gears.

Even if the parts are originally perfect and accurately related, which is seldom the case, the teeth and bearings for the gears after operating for a time, become worn and loosely fit to such an extent that the gears do not accurately mesh with the pinion. As a consequence, the teeth of the pinion will not press with equal force on the teeth of the gears, and the teeth become quickly worn or mutilated, and the objectionable pressure on the bearings exists.

Next will be described simple and effective means for automatically substantially equalizing the pressure of the teeth of the pinion on the teeth of the gears meshing therewith, so that the power taken from the pinion will always be practically equally divided between them; the pinion and gears will always properly mesh; and the pressure of the pinion shaft on its bearing will always be relieved.

To accomplish this, the pinion is mounted to permit the same to move bodily between the gears meshing therewith so it may float between them to a position or positions, such that the rotative driving force on the pinion will cause its teeth to press on the teeth of the gear at one side of the pinion, with the same force as the pressure of the pinion teeth on the teeth of the gear at the opposite side of the pinion.

The pinion will automatically assume a balanced position between the gears meshing therewith and will be in a sense carried by said gears, since the latter are obliged to rotate at the same speed, owing to the fact that they are fast on the counter shafts carrying the pinions meshing with the driven gear located intermediately of said pinions.

The pinion teeth in transmitting power to the gears, press up against the teeth of the gear at one side of the pinion and down against the teeth of the gear at the other side of the pinion. Consequently, the pressures of the pinion shaft on its bearings, reacting from the rotative driving force applied to the opposed gears, are neutralized and since the forces on said opposed gears are maintained equal, the pressures on said bearings are always neutralized.

In order that the pinion may assume a position to equalize the driving forces there-from on the opposed gears, suitable means should be provided to relieve said gears from the weight of the pinion, its shaft and bearings. To accomplish this, in the present instance of the invention, said bearings are mounted on and conveniently integral with a carrier or support 49 having a post 51 beneath said bearings with a socket 53 in the bottom thereof receiving a dowel pin 55 mounted in a boss 57 on the bottom of the casing. A web 59 above said bearings has a pair of sockets 61 receiving dowel pins 63 depending from the casing cover. These dowel pins serve to limit movement of the carrier toward the gears meshing with the pinion, but the carrier is sufficiently short to allow a certain amount of vertical movement thereof.

Suitable resilient means, conveniently in the form of a helical spring 65 may be mounted in the socket of the carrier post, between the top of its dowel pin and the end of said socket. This spring is of sufficient strength to balance the weight of the pinion, its shaft, bearings and the carrier therefor.

The construction is such that the pinion may readily move to a position to automatically equally distribute its rotative driving pressure on the teeth of the gears meshing therewith.

In the present instance of the invention, the gears are shown provided with curved teeth: that is, curved in the direction of their lengths. These curved teeth may desirably serve to automatically hold mating gears in proper alinement and insure the engagement of their teeth throughout the lengths thereof, thereby rendering the strength of the full lengths of said teeth available in transmitting the driving pressure from one to another, and preventing back lash, lost motion, and insuring accurate engagement of the teeth, even though there may be some inaccuracy in the gears or their mounting.

For example, if the axis of one gear should be slightly oblique to the axis of its mating gear so as to cause the center of the tooth of one gear to mesh with the end portion of the tooth of the other, the curvature of the teeth and the pressure of one on the other would cause them to tend to move one gear axially relatively to the other until the center of the teeth came into registration. To allow this tendency of the gears to become effective to aline the driving pinion and the gears 29 meshing therewith, the gear at the right of Fig. 2 may be confined against axial movement and the pinion and the gear at the left of Fig. 2 may have slight axial movement. To limit the movement of the gears in the direction of their axes, their hubs may engage ends of their bearings and ends of sleeves 67 having portions entered into and secured to the bearings. The sleeves partially inclose the pinions, but have openings 69 exposing said pinions sufficiently to permit them to mesh with the driven gear.

The sleeve for the right gear is so positioned that the latter is confined against axial movement, while the sleeve for the left gear leaves a space 71 between it and the hub of said gear to allow some axial movement of the latter. The driving pinion shaft is also permitted to have some axial movement.

The intermeshing teeth of the right gear and the driving pinion will automatically shift the latter axially and maintain the same in proper mesh with said gear; and the pinion in turn will similarly automatically shift the left gear axially to maintain the same in proper mesh with said pinion.

By my invention, the high speed of the motor shaft may be greatly reduced by a few gears with a consequent great increase in the torque attained on the driven shaft; and the power taken from the driving pinion will always be equally distributed to the gears meshing therewith, thereby reducing the strain on the teeth of the pinion and said gears and relieving the pressure on the bearings, and prolonging the life of the transmission and increasing the efficiency thereof.

While the invention has been described more particularly with the gears proportioned to effect speed reduction, it will be understood that many advantages thereof will obtain if the gears are differently proportioned or constructed to increase the speed transmitted.

In fact, various modifications may be made in utilizing the invention, and it is to be understood that the embodiment selected is merely one exemplification of the invention for accomplishing the results desired. Therefore, the claims are to be considered in a generic sense.

What is claimed is:—

1. A transmission mechanism for motors comprising in combination, a shaft, a pinion thereon, counter shafts, gears on the latter meshing with said pinion at points circumferentially spaced thereon, a movable support for said pinion shaft, and means yieldingly sustaining said support.

2. A transmission mechanism for motors comprising in combination, a shaft, a pinion thereon, counter shafts, gears on the latter meshing with said pinion at points circumferentially spaced thereon, a movable support for said pinion shaft, means preventing movement of said support toward said counter shafts, and means yieldingly sustaining said support.

3. A transmission mechanism for motors comprising in combination, a casing, a carrier mounted therein, spring means sustaining said carrier, a shaft journaled in said carrier, a pinion on said shaft, a shaft journaled in said casing, a gear on said shaft, counter shafts journaled in said casing, and gears on said counter shafts meshing with said pinion, and pinions on said counter shafts meshing with said first mentioned gear.

4. A transmission mechanism for motors comprising in combination, a driving gear, driven gears meshing with said driving gear, counter shafts for said driven gears, bearings for said counter shafts, pinions on the counter shafts, sleeves receiving said pinions having openings uncovering portions of said pinions, and a gear meshing with and driven by said pinions through said openings, said sleeves serving as stops to limit axial movement of said driven gears.

5. A speed-reducing transmission mechanism, comprising in combination, two groups of gears, each including a pair of gears disposed substantially horizontally and an intermediate gear meshing with the pair of gears, separate shafts for said intermediate gears, one of said shafts and its gear mounted for movement bodily and automatically in substantially a vertical direction to equalize the power transmitted by the pair of gears meshing therewith and to compensate for irregularities in the teeth of the gears, means for yieldingly sustaining the bodily movable shaft and gear, and means for restricting the movement of said movable gear to a plane passing between the gears with which the movable gear meshes.

6. A transmission mechanism for motors comprising in combination, a casing, two pairs of positively connected intermediate gears rotatably mounted in spaced relation within said casing, axially alined connecting gears between said pairs, a floating carrier for rotatably supporting one of said connecting gears, said carrier mounted to move in the direction of the driving pressures only, and means for yieldingly sustaining said floating carrier.

7. A transmission mechanism, comprising, in combination, two groups of gears, each including a pair of gears and an intermediate gear meshing with the pair of gears, separate shafts for said intermediate gears, means for supporting one of said shafts and its gear for movement bodily and automatically in a direction perpendicular to its axis of rotation to equalize the power transmitted by the pair of gears meshing therewith, comprising a movable support having spaced bearings for supporting the shaft with the gear between said bearings, and means for guiding the support in its movements along the path of a straight line.

In testimony whereof, I have signed my name to this specification.

WILLIAM C. FARNUM.